(12) United States Patent
Reeves et al.

(10) Patent No.: US 12,401,573 B2
(45) Date of Patent: Aug. 26, 2025

(54) GENERATING ORDER RECOMMENDATIONS FOR NETWORK SITE CONFIGURATIONS

(71) Applicant: T-Mobile USA, Inc., Bellevue, WA (US)

(72) Inventors: Raymond E. Reeves, Orlando, FL (US); Randald J. Umana, Mission Viejo, CA (US); John Paxton Smith, Wolfforth, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/353,052

(22) Filed: Jul. 14, 2023

(65) Prior Publication Data
US 2025/0023791 A1    Jan. 16, 2025

(51) Int. Cl.
*H04L 41/14* (2022.01)
*G06Q 30/0601* (2023.01)

(52) U.S. Cl.
CPC ....... *H04L 41/145* (2013.01); *G06Q 30/0631* (2013.01)

(58) Field of Classification Search
CPC .......................... G06Q 30/0631; H04L 41/145
See application file for complete search history.

(56) References Cited

U.S. PATENT DOCUMENTS

| | | | |
|---|---|---|---|
| 9,112,789 B2 * | 8/2015 | Anand | H04L 41/145 |
| 9,454,294 B2 * | 9/2016 | Sapuram | G06Q 30/0631 |
| 9,813,318 B2 * | 11/2017 | Lyoob | G06Q 30/0631 |
| 10,511,481 B1 * | 12/2019 | Castellanos | H04L 41/0883 |
| 11,150,957 B1 * | 10/2021 | Ferreira | G06F 3/0484 |
| 11,165,648 B1 * | 11/2021 | Bollineni | H04L 41/16 |
| 11,271,819 B1 * | 3/2022 | Whittaker | H04L 41/14 |
| 11,283,680 B2 * | 3/2022 | Kompella | H04L 41/122 |
| 11,360,795 B2 * | 6/2022 | Featonby | G06F 9/5027 |
| 11,533,240 B2 * | 12/2022 | Hudis | H04L 67/34 |
| 11,861,352 B2 * | 1/2024 | Baral | G06Q 10/0631 |
| 2012/0123898 A1 * | 5/2012 | Kirkeby | G06Q 30/0631 705/26.7 |
| 2013/0262189 A1 * | 10/2013 | Anderson | H04L 41/145 705/7.36 |

(Continued)

*Primary Examiner* — G. C. Neurauter, Jr.
(74) *Attorney, Agent, or Firm* — Foley IP Law, PLLC

(57) ABSTRACT

A computerized method analyzes proposed orders for network sites and generates associated order recommendations. A system configuration order (SCO) manager receives a proposed order from an ordering platform and generates a proposed site configuration using the proposed order and a current site configuration of the site. In some examples, the current site configuration is obtained from a network configuration manager associated with the site. The SCO manager generates a recommended site configuration using a configuration recommendation model and the proposed site configuration as input to the configuration recommendation model. A component difference between the recommended site configuration and the proposed site configuration is identified and an order recommendation is generated using the identified component difference. The generated order recommendation is then provided to the ordering platform. The SCO manager catches ordering errors and reduces ordering inefficiencies in complex site network management systems.

20 Claims, 6 Drawing Sheets

(56) References Cited

U.S. PATENT DOCUMENTS

| | | | |
|---|---|---|---|
| 2014/0222996 A1* | 8/2014 | Vasseur | H04L 43/02 |
| | | | 709/224 |
| 2014/0229607 A1* | 8/2014 | Jung | H04L 43/08 |
| | | | 709/224 |
| 2016/0019636 A1* | 1/2016 | Adapalli | H04L 67/10 |
| | | | 705/26.81 |
| 2022/0292529 A1* | 9/2022 | Kapich | H04L 41/147 |
| 2022/0327597 A1* | 10/2022 | Griesmer | G06Q 30/0631 |
| 2023/0164029 A1* | 5/2023 | Mermoud | H04L 41/145 |
| | | | 709/220 |

* cited by examiner

GENERATING ORDER RECOMMENDATIONS FOR NETWORK SITE CONFIGURATIONS

BACKGROUND

In large, distributed systems that include many different network sites, the management of equipment and/or component inventories throughout the network presents significant challenges. Manual placement of orders for components for the various network sites can often result in errors and/or inefficient ordering of components due to the use of incorrect equipment stock keeping units (SKUs), ordering of components that are already in inventory elsewhere in the site network, or the like. Such inefficiencies in orders throughout such a system cause significant negative impacts on the budgets of associated companies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for analyzing proposed orders for network sites and generating associated order recommendations is described. A system configuration order (SCO) manager receives a proposed order from an ordering platform and generates a proposed site configuration using the proposed order and a current site configuration of the site. In some examples, the current site configuration is obtained from a network configuration manager associated with the site. The SCO manager generates a recommended site configuration using a configuration recommendation model and the proposed site configuration as input to the configuration recommendation model. A component difference between the recommended site configuration and the proposed site configuration is identified and an order recommendation is generated using the identified component difference. The generated order recommendation is then provided to the ordering platform.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Aspects of the disclosure provide a system and method for analyzing proposed orders for network sites using a configuration recommendation model and generating order recommendations for those proposed orders. The disclosure is configured to receive proposed orders from an ordering platform and generate proposed site configurations using current site configurations and the proposed orders. The proposed site configurations are provided to the configuration recommendation model as input and the model generates recommended site configurations. In some examples, the configuration recommendation model is trained to generate recommended site configurations using a training set of site configurations that has been filtered based on performance data. The disclosure identifies component differences between the recommended site configurations and the proposed site configurations and generates order recommendations based on the identified component differences. The order recommendations are then provided to the ordering platform in response to the proposed orders. Thus, the disclosure uses data collected from network configuration managers of the site network to detect errors or inefficiencies in proposed orders and to make recommendations for improving the efficiency and/or correcting errors of the proposed orders.

The disclosure operates in an unconventional manner at least by integrating the network configuration managers of a distributed site network with the ordering platform thereof using the described SCO manager and associated configuration recommendation model. The disclosure uses the network configuration data and associated inventory information of the site network to analyze proposed orders and detect errors and/or inefficiencies in those orders. Further, the disclosure makes recommendations to ordering users for how to improve proposed orders, ensuring that detected errors and/or inefficiencies are reviewed and considered prior to proposed orders being completed. Thus, the disclosure reduces the monetary costs associated with the placement of erroneous or inefficient orders throughout the associated system. Additionally, the resource costs (e.g., use of processing resources and/or network resources within the system) associated with correcting for erroneous or inefficient orders after they have been placed are significantly reduced.

Further, in some examples, the disclosure operates to automatically recommend orders for components that will improve and/or optimize site networks in the system, thereby reducing the time during which site networks are operating with non-optimal site configurations. Such improvements in the efficiencies of site configurations across all sites in the site network yield improved system resource use efficiency and reduction of associated resource costs for the general operations of those sites that are improved and/or optimized.

Figure 1:
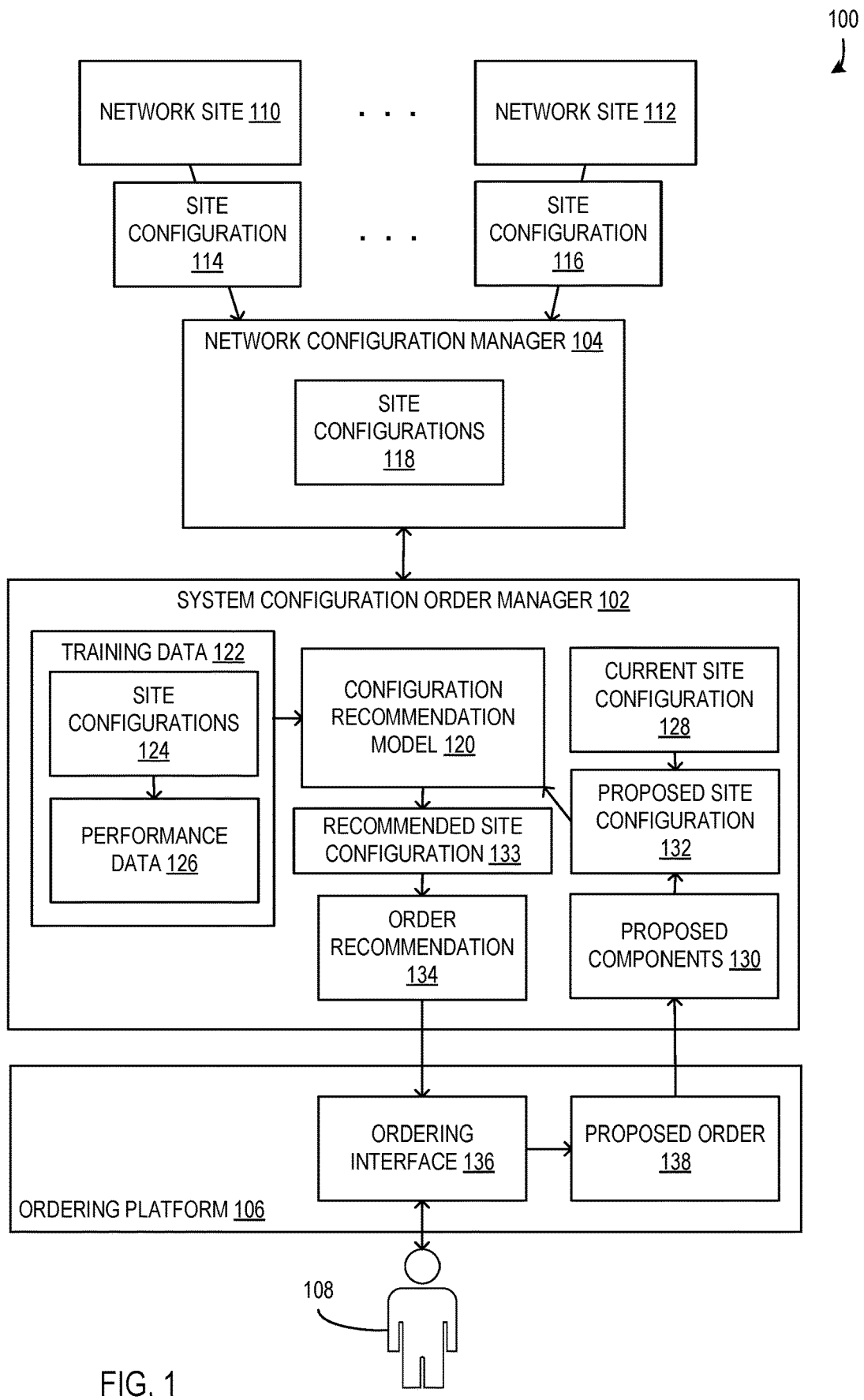
FIG. 1 is a block diagram illustrating an example system configured for generating an order recommendation using a configuration recommendation model.

FIG. 1 is a block diagram illustrating an example system 100 configured for generating an order recommendation 134 using a configuration recommendation model 120. The system 100 includes a system configuration order (SCO) manager 102, a network configuration manager 104, and an ordering platform 106. The SCO manager 102 interacts with both the network configuration manager 104 and the ordering platform 106 to improve the efficiency and accuracy of orders being placed by ordering users 108 on the ordering platform 106. In some cases, users 108 place orders on the ordering platform 106 that include errors, incompatible components, and/or component combinations that are likely to result in inefficient site operations. By leveraging the site configuration information that is maintained and managed by the network configuration manager(s) 104 of the system 100, the SCO manager 102 is configured to detect likely errors or other inefficiencies in proposed orders 138 before those orders are placed and to provide order recommendations 134 to the ordering users 108, enabling the users 108 to correct any issues with the proposed orders 138.

Further, in some examples, the system 100 includes computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the SCO manager 102 includes one or more computing devices that communicate with the network configuration manager 104 and/or the ordering platform 106 over a network. Additionally, or alternatively, the network sites 110-112 include a plurality of computing devices that are in communication with each other over one or more communication networks. In other examples, other organizations of computing devices are used to implement the system 100 without departing from the description.

The network configuration manager 104 includes hardware, firmware, and/or software configured for collecting, storing, and/or otherwise managing site configurations 118 associated with multiple network sites 110-112. In some examples, the network configuration manager 104 is configured to request site configurations 114-116 from the network sites 110-112 and to receive site configurations 114-116 in response to those requests. For instance, in an example, the network configuration manager 104 periodically sends requests to each network site 110-112 with which it is associated to maintain up-to-date site configurations 118.

Further, the network configuration manager 104 is configured to communicate and/or otherwise interact with the SCO manager 102. In some examples, the network configuration manager 104 provides site configurations 118 to the SCO manager 102 for use as site configurations 124 in training data 122 and/or for use as current site configurations 128 to use as input with the configuration recommendation model 120. In some such examples, the network configuration manager 104 responds to requests for site configurations 118 of specific network sites 110-112 from the SCO manager 102 for use as current site configurations 128. Alternatively, or additionally, in some examples, the network configuration manager 104 provides the SCO manager 102 with batches of site configurations 118 periodically and/or based on a defined trigger (e.g., a quantity of site configurations 118 that have changed since the last batch was sent to the SCO manager 102 reaches a defined threshold).

Additionally, or alternatively, the network configuration manager 104 generates and/or obtains performance data 126 associated with the performance of network sites 110-112 in association with the site configurations 114-116 of those network sites 110-112. The performance data 126 is provided to the SCO manager 102 for use as part of the training data 122 used to train the configuration recommendation model 120. In other examples, some or all of the performance data 126 used in the training data 122 is obtained by the SCO manager 102 from other sources without departing from the description.

The network sites 110-112 include sites and/or other locations that include components used to maintain and/or operate a network, such as a cellular network. Such network sites 110-112 include from small pole-based distributed micro sites to macro sites that have cellular network towers used to propagate wireless signals of the cellular network and/or otherwise communicate with devices that are connected to the cellular network. Additionally, or alternatively, other types of sites are in the network sites 110-112, such as storage sites that store inventories of components for use by other sites in the network. In other examples, other types of sites or locations are used and/or managed as described herein without departing from the description.

The site configurations (e.g., site configurations 114-116, 118, 124, etc.) include sets of components that are present, installed, and/or in use at specific network sites 110-112. In some examples, the components of a site configuration 118 include hardware, firmware, and/or software components that are in use at the associated network site 110-112. Such components can include computing devices, software and/or firmware installed on the computing devices, cables, hazard protection equipment, concealing accessories and/or other hardware used at the network site, or the like, irrespective of size.

The SCO manager 102 includes hardware, firmware, and/or software configured to train a configuration recommendation model to generate order recommendations 134 based on a set of proposed components 130 and a current site configuration 128. Further, the SCO manager 102 is configured to receive proposed components 130 of a proposed order 138 and to generate and provide an order recommendation 134 to the ordering platform 106 in response to those proposed components 130.

In some examples, the SCO manager 102 uses the training data 122 to train the configuration recommendation model 120 using machine learning techniques. For instance, in an example, the configuration recommendation model 120 includes a model trained to classify an input site configuration as being closest to one of a set of site configuration categories that are present in the site configurations 124 of the training data 122. In such an example, site configurations 124 of the training data 122 are divided into a plurality of categories and the configuration recommendation model 120 is then trained using the site configurations 124 of the categories to classify input site configurations (e.g., the proposed site configuration 132) as one or more of the categories. In some such examples, the performance data 126 is used to filter the site configurations 124 used during training to only include the site configurations 124 that meet or exceed a defined level of performance (e.g., only sites that have performance data 126 indicative of performance metrics in the top 30% of site configurations are used to train the configuration recommendation model 120).

Alternatively, or additionally, the configuration recommendation model 120 includes a model trained to generate site configurations using given sets of components (e.g., proposed components 130). The site configurations 124 are used to train the configuration recommendation model 120 by identifying site configurations 124 that have desirable performance metrics based on the associated performance data 126 and then analyzing the sets of components in those identified site configurations 124. The configuration recommendation model 120 is trained to associate the components of an identified site configuration 124 with each other to enable the model 120 to generate predicted or recommended components for input site configurations that are incomplete, inefficient, unreliable with high break rates, or that include incompatibilities or other issues. In some examples, the components of a site configuration are identified by the associated stock keeping unit (SKU) or other identifiers and the identifiers of the components are tokenized and encoded in the model 120. These encodings are then used to generate a set of components that are associated with both the encoded input components and also any previous components that have been generated for the output. An output set of components is compared to the proposed site configuration 132 that was provided as input and differences in the sets of components are used to generate the order recommendation 134 as described herein.

Further, the SCO manager 102 provides an interface via which proposed components 130 of a proposed order 138 are obtained from an ordering platform 106. The SCO manager 102 also obtains an identifier for the network site with which the proposed order 138 is associated. Using the obtained identifier, the current site configuration 128 of that network site is obtained and/or accessed. The current site configuration 128 and proposed components 130 are combined to form a proposed site configuration 132 and that is provided as input the configuration recommendation model 120.

In some examples, the configuration recommendation model 120 is configured to generate a recommended site configuration 133 based on the proposed site configuration 132. The recommended site configuration 133 is generated to be similar to site configuration patterns of one or more of the site configurations 124 in the training data 122 and to be similar to the proposed site configuration 132. Differences between the proposed site configuration 132 and the recommended site configuration 133 are used to generate the order recommendation 134. For instance, in an example, the recommended site configuration 133 includes a component A that is not present in the proposed site configuration and lacks a component B that is part of the proposed components 130 of the proposed site configuration 132. The SCO manager 102 identifies the difference and includes a recommendation to replace component B with component A in the order recommendation 134.

Further, in some examples, the configuration recommendation model 120 is configured to generate a recommended site configuration 133 such that components that are part of the current site configuration 128 are weighed more heavily than components in the proposed components 130. This means that the recommended site configuration 133 is more likely to include components that are already present at the network site in the current site configuration 128 than components that have yet to be ordered and delivered to the network site. Thus, the recommended site configuration 133 is generated to provide recommendations for how to improve the current site configuration 128 rather than recommending a site configuration that requires substantial reconfiguration of the current site configuration 128. However, it should be understood that, in some examples, the configuration recommendation model 120 generates a recommended site configuration 133 that does include component changes to the current site configuration 128 without departing from the description.

Additionally, or alternatively, the SCO manager 102 has access to inventory data associated with components that are stored at network sites 110-112 and the inventory data includes components that are stored at sites while not being in use currently. In such examples, the configuration recommendation model 120 is configured to use the inventory data when generating the recommended site configuration 133, such that the configuration recommendation model 120 is more likely to recommend a site configuration 133 that includes components that can be obtained from other network sites 110-112 rather than components that would be ordered from outside the network. Thus, the SCO manager 102 is configured to enable the network to efficiently use components that have already been purchased and to reduce the occurrences of purchasing components that could be sourced from within the set of network sites 110-112.

The ordering platform 106 includes hardware, firmware, and/or software configured to enable a user 108 to propose and place orders (e.g., proposed order 138) for components intended for use at one or more of the network sites 110-112. In some examples, the ordering platform 106 includes an ordering interface 136 (e.g., a GUI interface) that enables a user 108 to select components to be included in an order, to propose an order, to update an order, and/or to confirm or complete an order. Ordering users 108 access the ordering platform 106 and generate proposed orders 138 of proposed components 130 using the ordering interface 136.

Further, the ordering platform 106 is configured to receive order recommendations 134 from the SCO manager 102 in response to providing proposed components 130 of a proposed order 138 to the SCO manager 102 for analysis as described herein. In some examples, an order recommendation 134 is displayed or otherwise provided to an ordering user 108 via the ordering interface 136 that includes one or more components that are recommended to be included in the proposed order. The ordering user 108 is enabled to update the proposed order 138 to include one or more of the recommended components or to reject the recommended components and make no changes to the proposed order 138. Additionally, or alternatively, the order recommendation 134 includes a recommendation that one or more components be removed from the proposed order 138 (e.g., the components to be removed are incompatible with the site configuration or they can be source from within the network rather than ordered). The recommendation to remove the one or more components is displayed or otherwise provided to the ordering user 108 via the ordering interface 136 and the ordering user 108 is enabled to update the proposed order 138 by removing one or more of the components in the order recommendation 134. In other examples, more or different recommendations of components to be added to and/or removed from the proposed order 138 are provided to the ordering user 108 via the ordering interface 136 without departing from the description.

Additionally, or alternatively, the ordering interface 136 displays or otherwise provides the order recommendation 134 in the form of one or more recommended site configurations (e.g., recommended site configuration 133). The components of a recommended site configuration are displayed to the ordering user 108 and the recommended changes between the proposed order 138 and the components of the recommended site configuration are highlighted to the ordering user 108. Further, the user 108 is enabled to make changes to the proposed order 138 through interactions with components of the displayed recommended site configuration. Additional information about the recommended site configurations is displayed to the user, such as predicted or estimated performance metrics of the recommended site configuration (e.g., based on the performance data 126). Thus, the ordering user 108 is provided more contextual information about the recommended site configuration and why that site configuration might be an improvement over the set of components in the proposed order 138.

In some examples, the ordering interface 136 provides or displays prompts with the order recommendation 134 to provide the ordering user 108 with more information about the recommendation 134. For instance, in an example, the order recommendation 134 includes a recommendation to swap a component A for component B in the proposed order 138. The SCO manager 102 detects that the component A in the proposed components 130 is actually incompatible with another part of the site configuration, while component B is compatible with the site configuration. The ordering interface 136 provides the ordering user 108 with a prompt explaining the incompatibility, enabling the ordering user 108 quickly determine whether to accept the recommended change to the proposed order 138. In many cases, the ordering user 108 included component A instead of component B by mistake and SCO manager 102 accurately detected the mistake. In other cases, the ordering user 108 has ordered component A intentionally for another purpose, such that the ordering user 108 does not replace component A with component B in the proposed order 138 or the ordering user 108 adds component B to the proposed order 138 while keeping component A on the proposed order 138.

Additionally, or alternatively, the SCO manager 102 is configured to automatically make changes to proposed orders based on the generated order recommendations. For instance, in some examples, if a proposed order results in a proposed site configuration that is significantly different from any known, recommended site configuration, the SCO manager 102 is configured to provide the order recommendation in the form of a changed order. In some such examples, an ordering user that prefers to proceed with the original proposed order is required to override the SCO manager 102 recommendation and/or to provide reason for proceeding with the abnormal proposed order. Such a reason may be reviewed by another user of the system and/or other parts of the system, such that ordering mistakes that result in abnormal orders are more likely to be caught within the described process.

Further, in some examples, the SCO manager 102 is configured to generate proposed orders for sites without receipt of a proposed order from an ordering user. For instance, in an example, the SCO manager 102 receives a current site configuration 128 of a site and analyzes it with the configuration recommendation model 120. The configuration recommendation model 120 generates a recommended site configuration 133 that differs significantly from the current site configuration 128. The SCO manager 102 then generates a proposed order based on component differences between the recommended site configuration 133 and the current site configuration 128. The proposed order is provided to the ordering platform 106 and/or to another entity in the system for review and/or completion of the order. Thus, the SCO manager 104 is configured to automatically perform order generation to maintain the site configurations of the sites in the associated site network. Further, in some examples, the SCO manager 102 is configured to generate proposed orders for parts that have been historically determined to reach a critical performance level requiring their replacement before a catastrophic fault occurs.

Figure 2:
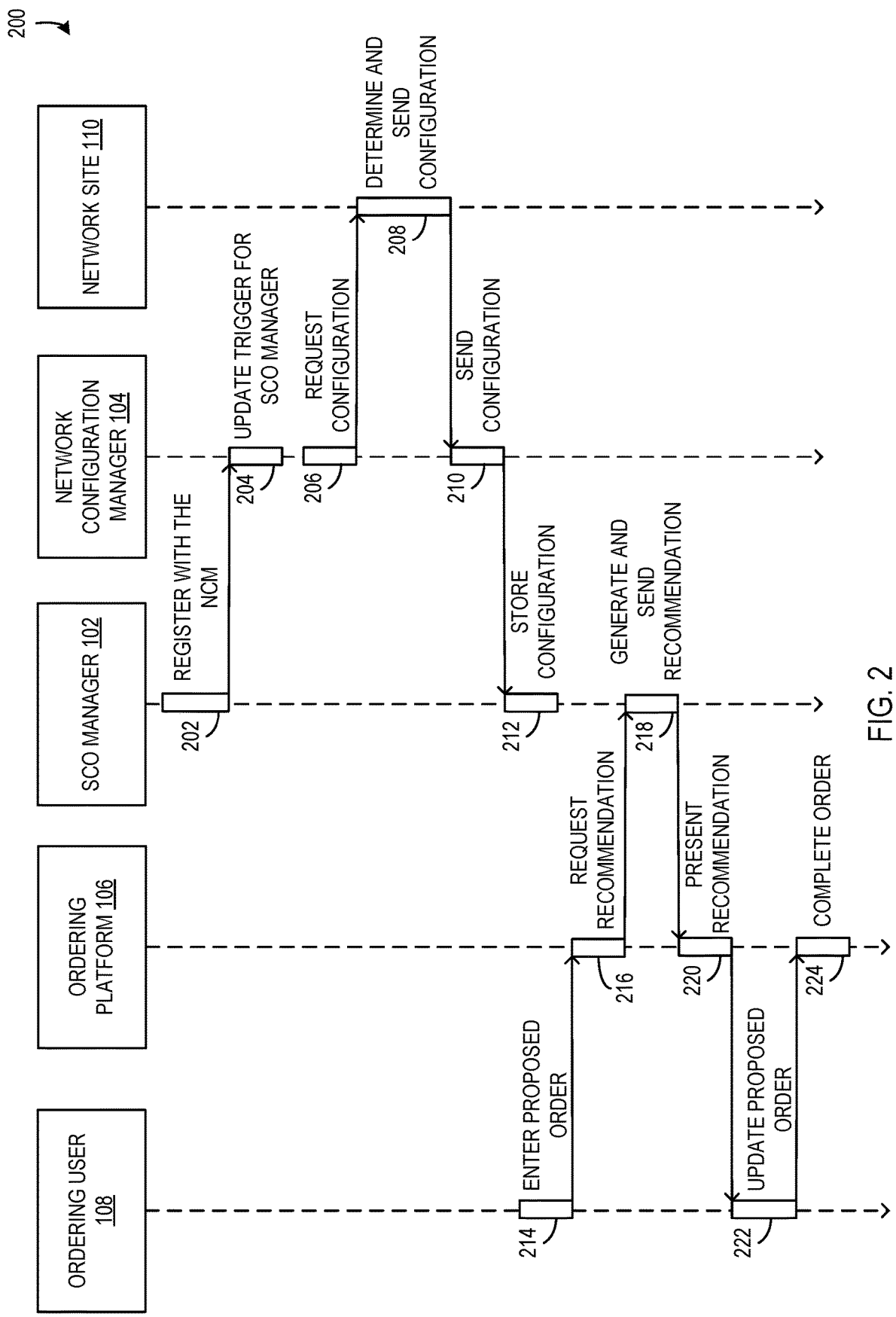
FIG. 2 is a sequence diagram illustrating an example process for configuring and using a system configuration order manager to provide order recommendations.

FIG. 2 is a sequence diagram illustrating an example process 200 for configuring and using a SCO manager 102 to provide order recommendations (e.g., order recommendations 134). In some examples, the process 200 is executed or otherwise performed in a system such as system 100 of FIG. 1.

At 202, the SCO manager 102 registers with the network configuration manager 104. In some examples, the registration process includes providing the network configuration manager 104 with instructions and/or associated information that enables the network configuration manager 104 to provide the SCO manager 102 with the appropriate information, such as site configuration data (e.g., current site configurations 128 and/or site configurations 124 for use in training data 122). Further, the registration with the network configuration manager 104 regarding when and/or how to send such information, such as establishing a schedule for sending site configuration information periodically or rules for when the network configuration manager 104 sends new or updated site configuration information.

At 204, the network configuration manager 104 updates a trigger for when and/or how to send information to the SCO manager 102 based on the registration of the SCO manager 102 at 202. The updated trigger includes software that detects one or more trigger states and based on that detection, causes the network configuration manager 104 to send site configuration information of one or more network sites 110-112 to the SCO manager 102. For instance, in an example, the network configuration manager 104 is triggered to send site configuration information of a network site 110 to the SCO manager 102 upon detecting that the site configuration of the network site 110 has been updated or otherwise changed.

At 206, the network configuration manager 104 requests a configuration from a network site 110. In some examples, the network configuration manager 104 requests configurations from a plurality of different network sites 110-112. Such requests are sent to network sites periodically or according to some other pattern. Additionally, or alternatively, the network configuration manager 104 requests configurations from network sites 110-112 based on a triggering event. Further, in some examples, the network site 110 is configured to send a notification and/or its configuration to the network configuration manager 104 upon the configuration being changed.

At 208, the network site 110 determines its current configuration and sends the configuration to the network configuration manager 104 in response to the request at 206. In some examples, the network site 110 is configured to perform software operations to determine the set of components that currently make up the configuration of the network site 110.

At 210, the network configuration manager 104 sends the configuration of the network site 110 to the SCO manager 102. In some examples, the network configuration manager 104 is configured to send the configuration to the SCO manager 102 based on receiving the configuration from the network site 110. Alternatively, or additionally, the network configuration manager 104 is configured to send configurations received from network sites to the SCO manager 102 periodically and/or based on the occurrence of a triggering event (e.g., the quantity of site configurations to be sent to the SCO manager 102 reaches a defined threshold).

At 212, the SCO manager 102 stores the received configuration. In some examples, the stored configuration is used as part of training data (e.g., training data 122) for use in training the configuration recommendation model 120 of the SCO manager 102. Alternatively, or additionally, the stored configuration is used as a current site configuration (e.g., current site configuration 128) when the SCO manager 102 is analyzing a proposed order (e.g., proposed order 138) and providing an order recommendation (e.g., order recommendation 134) associated therewith.

At 214, an ordering user 108 enters a proposed order into the ordering platform 106. It should be understood that, in some examples, the entering of the proposed order at 214 occurs some time after the storing of the configuration at 212 and, in other examples, the process from 202-212 is performed during substantially the same time period as the process from 214-224 without departing from the description.

At 216, the ordering platform 106 requests an order recommendation from the SCO manager 102. In some examples, the request for the order recommendation includes providing the SCO manager 102 with data from the proposed order, such as the proposed components (e.g., proposed components 130). Further, the request for the order recommendation includes an identifier or indicator of the network site with which the proposed order is associated, enabling the SCO manager 102 to access the current site configuration of that network site for use in generating the order recommendation as described herein.

At 218, the SCO manager 102 generates and sends the recommendation (e.g., the order recommendation 134) to the ordering platform 106 and, at 220, the recommendation is presented to the ordering user 108 by the ordering platform 106 (e.g., via an ordering interface 136). In some examples, the generation of the recommendation includes generating one or more recommended site configurations and populating the recommendation with component changes required to create one of the recommended site configurations at the associated network site, as described herein.

At 222, the ordering user 108 updates the proposed order using the presented recommendation. In some examples, the ordering user 108 is enabled to remove components, add components, swap components, and/or make other changes to the proposed order through interaction with the presented recommendation. For instance, in an example, the presented recommendation includes a list of the components of a recommended site configuration and highlighted portions indicating the changes that need to be made to the proposed order to achieve the recommended site configuration. In such an example, the ordering user 108 is enabled to select the recommended site configuration and, through that selection, cause the proposed order to be changed according to the highlighted portions of the presented recommendation. In other examples, the ordering user 108 is enabled to update the proposed order using other methods without departing from the description.

At 224, after updating the proposed order, the ordering platform 224 completes the order, such that the order is placed or otherwise initiated. In some examples, as a result of the presented recommendation from the SCO manager 102, the ordering user 108 is enabled to avoid errors and/or inefficiencies in the proposed order.

Figure 3:
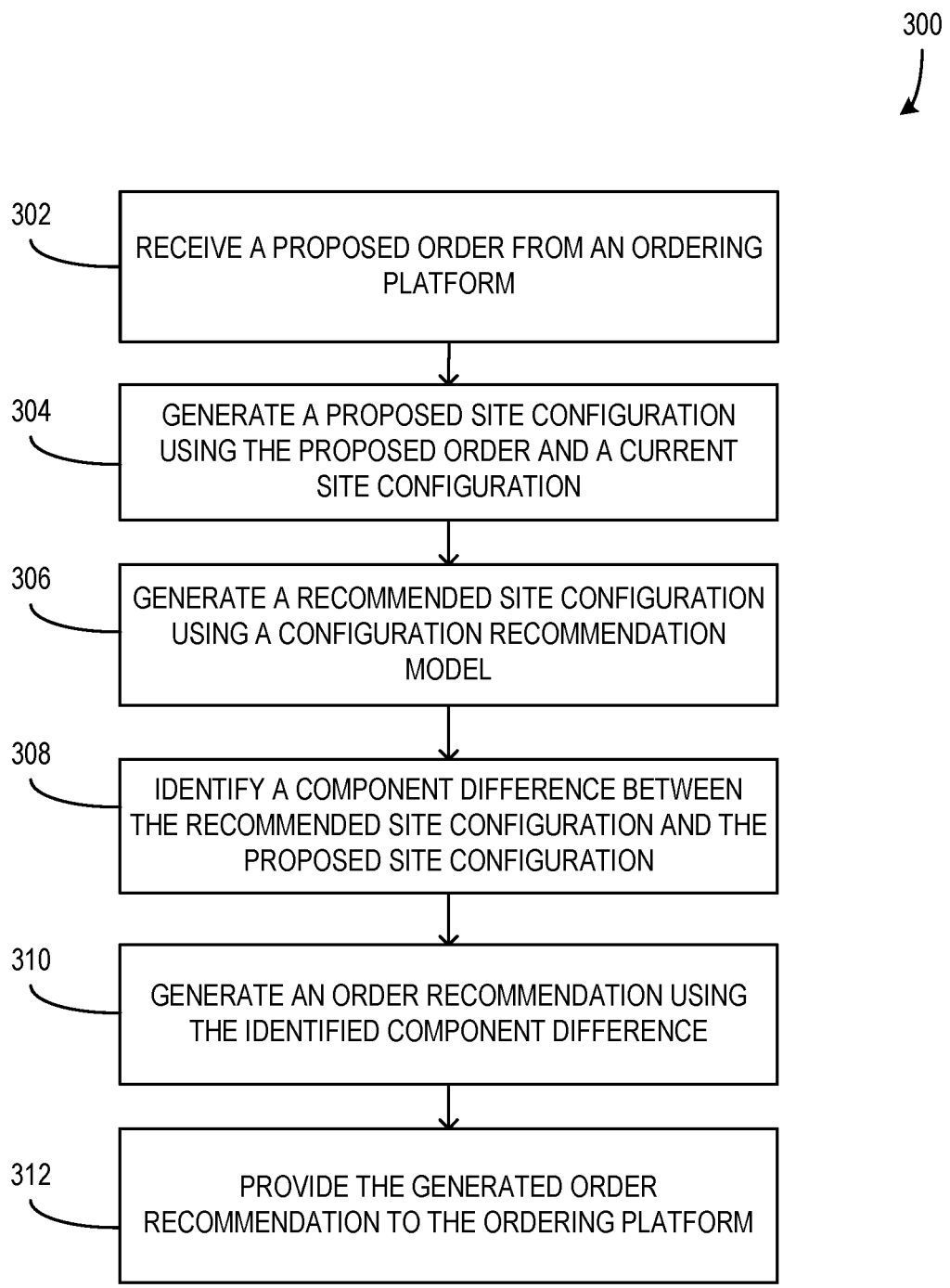
FIG. 3 is a flowchart illustrating an example method for providing an order recommendation in response to a proposed order using a system configuration order manager.

FIG. 3 is a flowchart illustrating an example method 300 for providing an order recommendation (e.g., order recommendation 134) in response to a proposed order (e.g., proposed order 138) using a SCO manager (e.g., SCO manager 102). In some examples, the method 300 is executed or otherwise performed in a system such as system 100 of FIG. 1.

At 302, a proposed order is received from an ordering platform. In some examples, the proposed order includes a set or group of proposed components that are to be ordered and/or other configuration information associated with the proposed components of the proposed order.

At 304, a proposed site configuration is generated using the proposed order and a current site configuration of the site for which the proposed order is being proposed. In some examples, the current site configuration is stored by and accessed by the SCO manager 102. Alternatively, in some examples, the current site configuration is requested from a network configuration manager (e.g., network configuration manager 104) with which the site is associated.

Further, in some examples, generating the proposed site configuration includes combining components of the site that are present in the current site configuration with the proposed components of the proposed order. In some such examples, the SCO manager 102 is configured to determine when a proposed component is likely to be added to the components of the current site configuration and/or when a proposed component is likely to be used to replace an existing component of the current site configuration. When such a determination is made, the proposed site configuration is generated to include an indication of whether a proposed component is intended to replace an existing component or just be added to the set of existing components. Such determinations are made using specification data of components that provides information about how components interact with each other, capacities for components to be connected with other components, and/or requirements for components that a particular component needs to operate.

At 306, a recommended site configuration (e.g., recommended site configuration 133) is generated using a configuration recommendation model (e.g., the configuration recommendation model 120). In some examples, the proposed site configuration, including data of the current site configuration and the proposed order, are used as input to the configuration recommendation model and the configuration recommendation model classifies the proposed site configuration as being similar to the recommended site configuration and/or the configuration recommendation model otherwise generates the recommended site configuration. For instance, in an example, the configuration recommendation model is trained to generate components of the recommended site configuration based on the components present in the proposed site configuration and based on components that have already been generated for the recommended site configuration. Further, in some examples, the recommended site configuration is generated based on inventory data of the network of sites of which the site is a part, such that components of the recommended site configuration are more likely to be components that can be obtained from elsewhere in the site network rather than purchased from outside the site network.

At 308, a component difference between the recommended site configuration and the proposed site configuration is identified. In some examples, the component difference includes a component that is present in the recommended site configuration but not present in the proposed site configuration. Alternatively, or additionally, the component difference includes a component that is present in the proposed site configuration but not present in the recommended site configuration. In other examples, other types of component differences are identified, such as differing versions of components, without departing from the description.

At 310, an order recommendation is generated using the identified component difference. In some examples, the order recommendation includes a recommendation to include a component in the order that is present in the recommended site configuration and/or to remove a component from the order that is not present in the recommended site configuration. In some such examples, the order recommendation includes a recommendation to replace a first component with a second component in the order, wherein the first component is present in the proposed site configuration and the second component is present in the recommended site configuration.

Further, in some examples, the SCO manager uses the configuration recommendation model to generate a plurality of recommended site configurations and then identifies a plurality of component differences between each recommended site configuration and the proposed site configuration. In some such examples, the generated order recommendation includes one or more recommendations associated with each recommended site configuration of the plurality recommended site configurations. Further, the order recommendation is generated to include information that describes or otherwise provides context information for each of the recommended site configurations, such that an ordering user that views the order recommendation can make an informed decision regarding which recommended site configuration to emulate, if any.

At 312, the generated order recommendation is provided to the ordering platform. In some examples, the order recommendation is then displayed or otherwise presented to an ordering user via an ordering interface (e.g., ordering interface 136). Further, in some examples, the ordering user using the ordering platform is enabled to make changes to the proposed order based on the order recommendation using the ordering interface.

Figure 4:
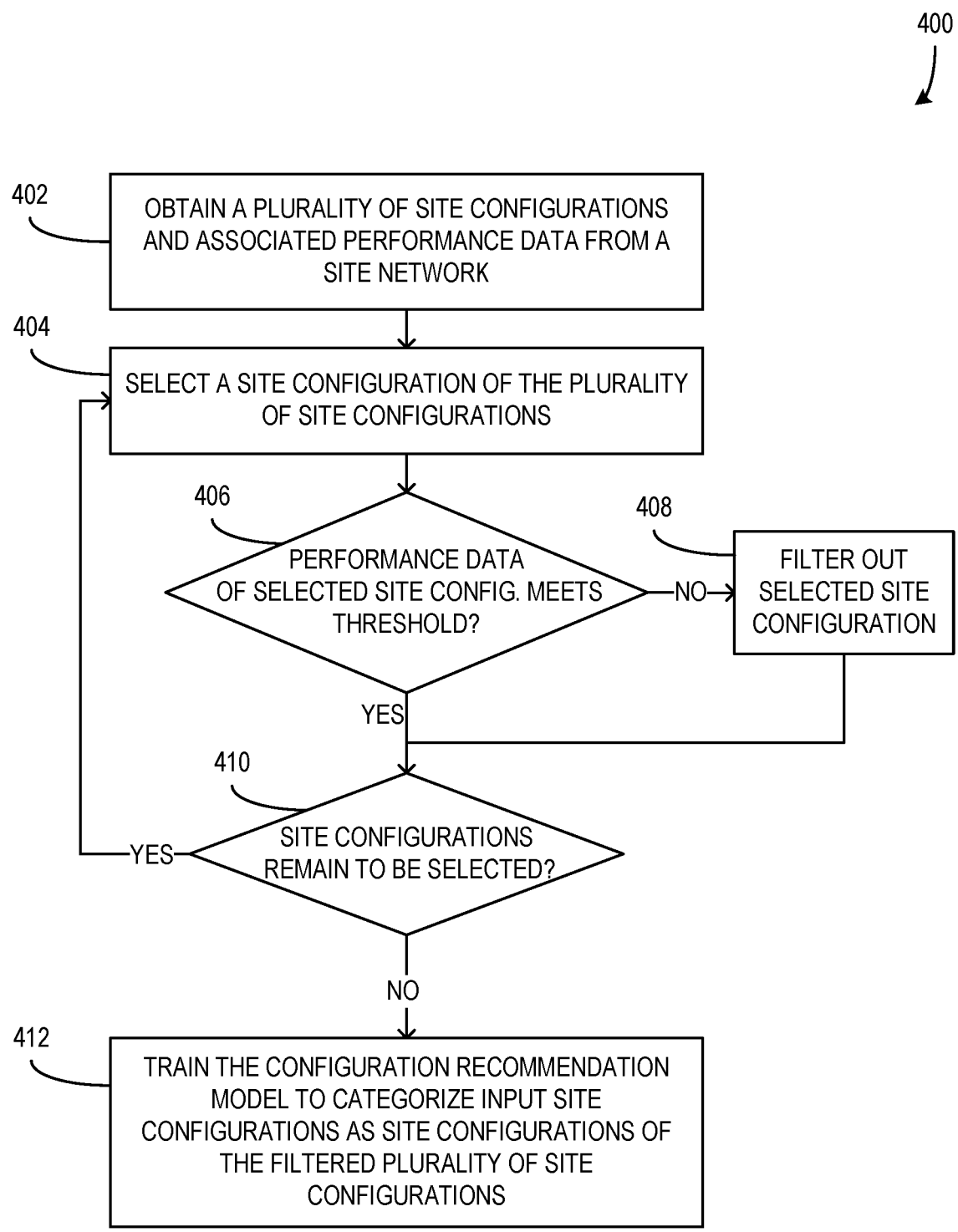
FIG. 4 is a flowchart illustrating an example method for training a configuration recommendation model using site configurations and performance data as training data.

FIG. 4 is a flowchart illustrating an example method 400 for training a configuration recommendation model (e.g., configuration recommendation model 120) using site configurations (e.g., site configurations 124) and performance data (e.g., performance data 126) as training data (e.g., training data 122). In some examples, the method 400 is executed or otherwise performed in a system such as system 100 of FIG. 1.

At 402, a plurality of site configurations and associated performance data are obtained from a site network. In some examples, the site configurations and performance data are obtained from one or more network configuration managers (e.g., network configuration manager 104).

At 404, a site configuration of the plurality of site configurations is selected. At 406, if the performance data of the selected site configuration does not meet a defined threshold or thresholds, the selected site configuration is filtered out of the plurality of site configurations at 408. Alternatively, if the performance data of the selected site configuration does meet the defined threshold or thresholds, the process proceeds to 410.

At 410, if site configurations remain to be selected in the plurality of site configurations, the process returns to 404 to select another site configuration that has not yet been selected. Alternatively, if no site configurations remain to be selected the process proceeds to 412.

At 412, the configuration recommendation model is trained to categorize input site configurations as site configurations of the filtered plurality of site configurations. Alternatively, or additionally, the configuration recommendation model is trained to generate groups or sets of components in the form of recommended site configurations based on patterns of components that are present in the filtered plurality of site configurations as described herein.

Figure 5:
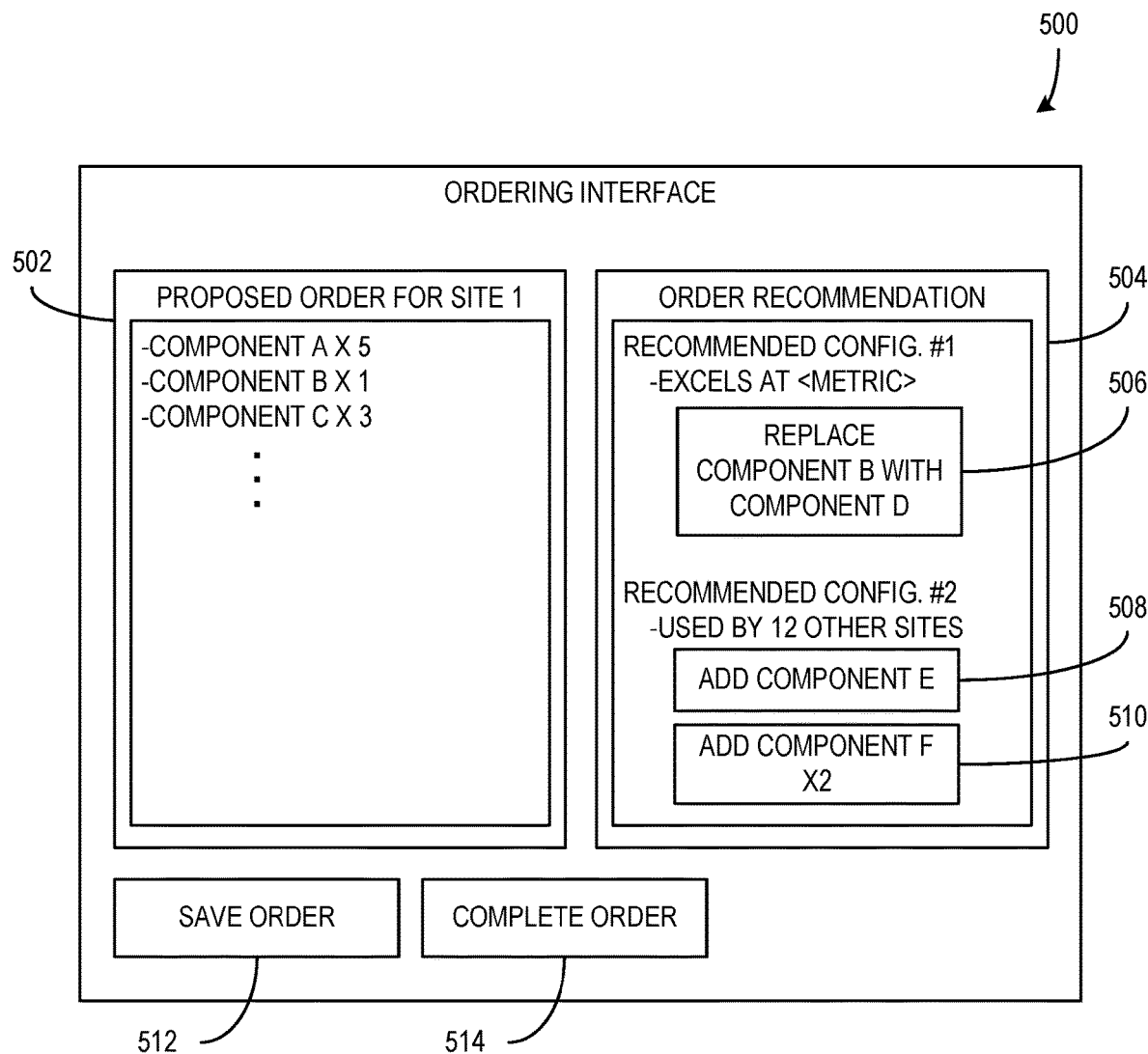
FIG. 5 is a diagram illustrating an example graphical user interface (GUI) for displaying an order recommendation to an ordering user.

FIG. 5 is a diagram illustrating an example graphical user interface (GUI) 500 for displaying an order recommendation (e.g., order recommendation 134) to an ordering user (e.g., ordering user 108). In some examples, the GUI 500 is displayed or otherwise presented to a user as part of an ordering interface, such as ordering interface 136 of the ordering platform 106 in system 100 of FIG. 1.

The GUI 500 includes a proposed order portion 502 that displays information about the current proposed order. As illustrated, the displayed information includes a list of components that are being ordered for the site and an identifier of the site itself. It should be understood that, in other examples, more and/or different information about the proposed order is displayed without departing from the description.

The GUI 500 further includes an order recommendation portion 504. As illustrated, the order recommendation portion 504 displays recommendations and information associated with multiple recommended site configurations, including a recommended config. #1 and a recommended config. #2. The order recommendation portion 504 displays contextual information about each of the recommended site configurations, including a performance metric at which the first recommended site configuration excels and a quantity of other sites that use the second recommended site configuration. In other examples, more, less, and/or different context information is provided about recommended site configurations without departing from the description.

Additionally, the order recommendation portion 504 as illustrated provides order change buttons 506, 508, and 510 to enable an ordering user to quickly and easily make changes to the proposed order that are in line with one of the recommended site configurations. For instance, in an example, a user selects the order change button 506 and the proposed order is changed by replacing the order for component B with an order for component D. Alternatively, in another example, the user selects the order change buttons 508 and 510 and the proposed order is changed adding an order for a component E and an order for two of component F. In other examples, more, fewer, and/or different recommended changes are displayed in the portion 504 without departing from the description. Further, in other examples, more and/or different types of user interface components are used without departing from the description.

The GUI 500 includes a save order button 512 and a complete order button 514. The save order button 512 enables the ordering user to save the proposed order in its current state for later access and the complete order button 514 causes the proposed order to be sent out for completion.

Exemplary Operating Environment

Figure 6:
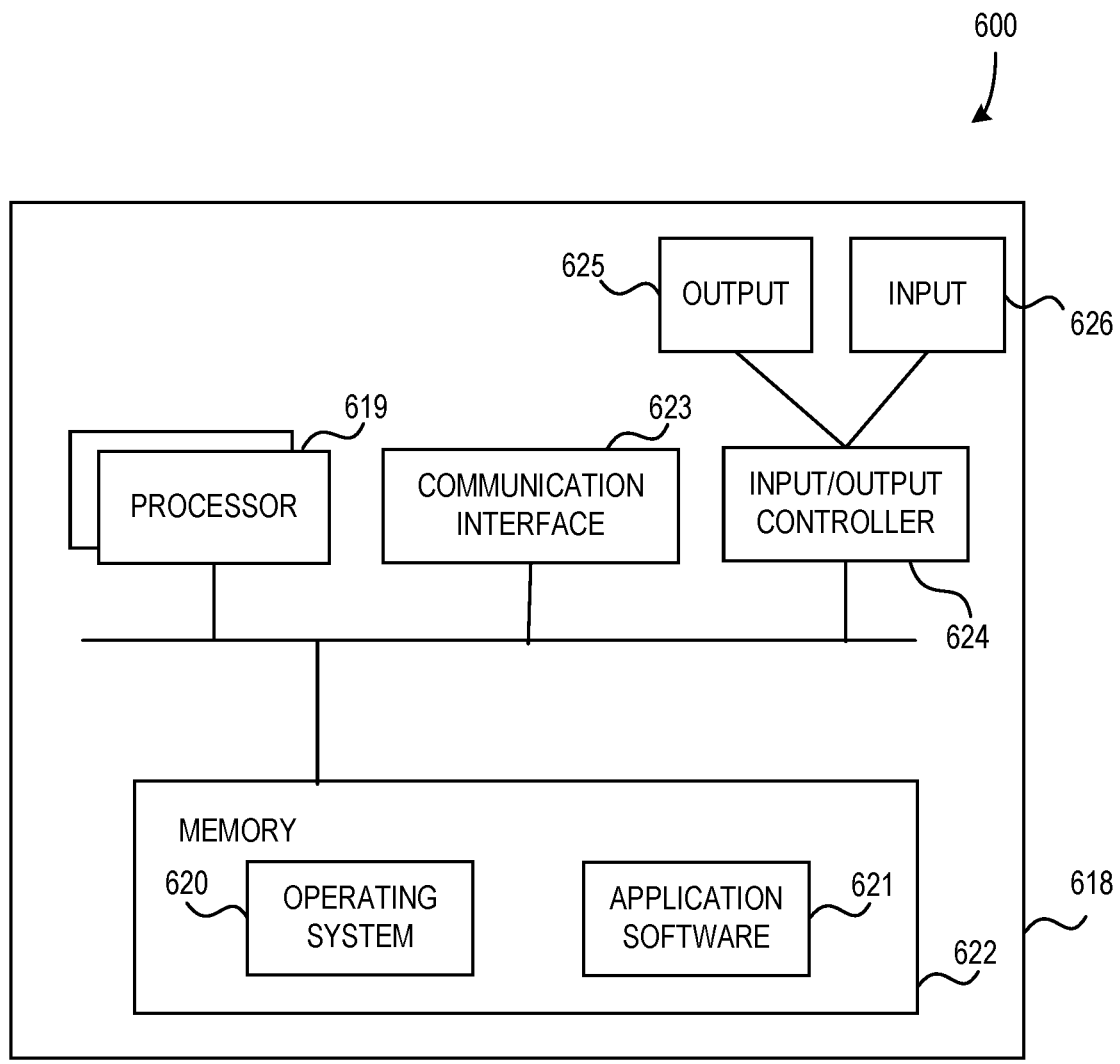
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, analyzing proposed orders to generate order recommendations as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to: receive a proposed order associated with a site from an ordering platform; generate a proposed site configuration using the proposed order and a current site configuration of the site; generate a recommended site configuration using a configuration recommendation model and the proposed site configuration as input to the configuration recommendation model; identify a component difference between the recommended site configuration and the proposed site configuration; generate an order recommendation using the identified component difference; and provide the generated order recommendation to the ordering platform.

An example computerized method comprises: receiving a proposed order associated with a site from an ordering platform; generating a proposed site configuration using the proposed order and a current site configuration of the site; generating a recommended site configuration using a configuration recommendation model and the proposed site configuration as input to the configuration recommendation model; identifying a component difference between the recommended site configuration and the proposed site configuration; generating an order recommendation using the identified component difference; and providing the generated order recommendation to the ordering platform.

One or more computer storage media having computer-executable instructions that, upon execution by a processor, cause the processor to at least: receive a proposed order associated with a site from an ordering platform; generate a proposed site configuration using the proposed order and a current site configuration of the site; generate a recommended site configuration using a configuration recommendation model and the proposed site configuration as input to the configuration recommendation model; identify a component difference between the recommended site configuration and the proposed site configuration; generate an order recommendation using the identified component difference; and provide the generated order recommendation to the ordering platform.

Alternatively, or in addition to the other examples described herein, examples include any combination of the following:

wherein identifying the component difference between the recommended site configuration and the proposed site configuration includes identifying one or more of the following: a component in the recommended site configuration that is not present in the proposed site configuration; and a component in the proposed site configuration that is not present in the recommended site configuration.

wherein identifying the component difference between the recommended site configuration and the proposed site configuration includes: identifying a first component in the recommended site configuration that is not present in the proposed site configuration; identifying a second component in a proposed order that is not present in the recommended site configuration; and wherein the generated order recommendation includes a recommendation to replace the second component with the first component in the proposed order.

wherein generating the order recommendation uses inventory data of a site network associated with the site and the inventory data indicates that the second component is available in the site network.

further comprising training the configuration recommendation model, the training including: obtaining a plurality of site configurations and associated performance data from a site network associated with the site; filtering site configurations that are associated with performance data below a defined performance threshold from the plurality of site configurations; and training the configuration recommendation model to receive an input site configuration and to identify a site configuration of the filtered plurality of site configurations that is similar to the input site configuration.

wherein generating a recommended site configuration includes generating a plurality of recommended site configurations; wherein identifying the component difference includes identifying component differences between the proposed site configuration and each recommended site configuration of the plurality of recommended site configurations; and wherein the generated order recommendation includes a plurality of recommendations for changes to the proposed order associated with each recommended site configuration of the plurality of recommended site configurations.

further comprising: determining an identifier of the site; requesting the current site configuration of the site from a network configuration manager using the determined identifier; and receiving the requested current site configuration from the network configuration manager.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a proposed order associated with a site from an ordering platform; exemplary means for generating a proposed site configuration using the proposed order and a current site configuration of the site; exemplary means for generating a recommended site configuration using a configuration recommendation model and the proposed site configuration as input to the configuration recommendation model; exemplary means for identifying a component difference between the recommended site configuration and the proposed site configuration; exemplary means for generating an order recommendation using the identified component difference; and exemplary means for providing the generated order recommendation to the ordering platform.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to cause the processor to:
obtain a plurality of site configurations associated with a plurality of network sites based on an occurrence of a triggering event;
receive a proposed order associated with a network site of the plurality of network sites from an ordering platform, wherein the proposed order comprises a set of proposed components to be ordered together;
generate a proposed site configuration by combining the set of proposed components of the proposed order and a set of existing components of a current site configuration of the network site;
generate a recommended site configuration using a configuration recommendation model and the proposed site configuration as input to the configuration recommendation model;
identify a component difference between the recommended site configuration and the proposed site configuration;
generate an order recommendation using the identified component difference, wherein the order recommendation comprises a plurality of recommended changes;
provide the generated order recommendation to the ordering platform;
present, via an order interface of the ordering platform, a site identifier of the network site, the set of proposed components of the proposed order, and the plurality of recommended changes;
receive, via the order interface, an ordering user's interaction with the presented plurality of recommended changes;
cause the proposed order to be changed according to a recommended change of the plurality of recommended changes based on the ordering user's interaction;

obtain performance data associated with the plurality of site configurations;
compare the performance data to a defined performance threshold;
filter the plurality of site configurations to remove site configuration that are associated with performance data below the defined performance threshold; and
generate a training set of site configurations comprising the filtered plurality of site configurations, wherein the configuration recommendation model is further trained using the training set of site configurations.

2. The system of claim 1, wherein the plurality of recommended changes comprise a recommendation to remove an incompatible component from the proposed order.

3. The system of claim 1, wherein the triggering event comprises one or more of the plurality of network sites sending a notification upon a configuration change.

4. The system of claim 1, wherein each component of the filtered plurality of site configurations is identified by a corresponding component identifier of a plurality of component identifiers, and wherein the plurality of component identifiers are tokenized and encoded in the configuration recommendation model.

5. The system of claim 1, wherein the memory and the computer program code are configured to further cause the processor to:
present, via the ordering interface, a set of order change buttons, each of the set of order change buttons associated with a corresponding recommended change of the plurality of recommended changes.

6. The system of claim 1, wherein generating the recommended site configuration includes generating a plurality of recommended site configurations;
wherein identifying the component difference includes identifying component differences between the proposed site configuration and each recommended site configuration of the plurality of recommended site configurations;
wherein the plurality of recommended changes includes a plurality of recommendations for changes to the proposed order associated with each recommended site configuration of the plurality of recommended site configurations;
wherein each of the plurality of recommended changes is displayed with contextual information; and
wherein the contextual information comprises a quantity of other sites of the plurality of network sites that use a specific site configuration of the plurality of recommended site configuration.

7. The system of claim 1, wherein the plurality of network sites comprise small pole-based distributed micro sites and cellular network tower-based macro sites.

8. A computerized method comprising:
obtaining a plurality of site configurations associated with a plurality of network sites based on an occurrence of a triggering event;
receiving a proposed order associated with a network site of the plurality of network sites from an ordering platform, wherein the proposed order comprises a set of proposed components to be ordered together;
generating a proposed site configuration by combining the set of proposed components of the proposed order and a set of existing components of a current site configuration of the network site;

generating a recommended site configuration using a configuration recommendation model and the proposed site configuration as input to the configuration recommendation model;
identifying a component difference between the recommended site configuration and the proposed site configuration;
generating an order recommendation using the identified component difference, wherein the order recommendation comprises a plurality of recommended changes;
providing the generated order recommendation to the ordering platform;
presenting, via an order interface of the ordering platform, a site identifier of the network site, the set of proposed components of the proposed order, and the plurality of recommended changes;
receiving, via the order interface, an ordering user's interaction with the presented plurality of recommended changes;
causing the proposed order to be changed according to a recommended change of the plurality of recommended changes based on the ordering user's interaction;
obtaining performance data associated with the plurality of site configurations;
comparing the performance data to a defined performance threshold;
filtering the plurality of site configurations to remove site configuration that are associated with performance data below the defined performance threshold; and
generating a training set of site configurations comprising the filtered plurality of site configurations, wherein the configuration recommendation model is further trained using the training set of site configurations.

9. The computerized method of claim 8, wherein the plurality of recommended changes comprise a recommendation to remove an incompatible component from the proposed order.

10. The computerized method of claim 8, wherein the triggering event comprises one or more of the plurality of network sites sending a notification upon a configuration change.

11. The computerized method of claim 8, wherein each component of the filtered plurality of site configurations is identified by a corresponding component identifier of a plurality of component identifiers, and wherein the plurality of component identifiers are tokenized and encoded in the configuration recommendation model.

12. The computerized method of claim 8, further comprising:
presenting, via the ordering interface, a set of order change buttons, each of the set of order change buttons associated with a corresponding recommended change of the plurality of recommended changes.

13. The computerized method of claim 8, wherein generating a recommended site configuration includes generating a plurality of recommended site configurations;
wherein identifying the component difference includes identifying component differences between the proposed site configuration and each recommended site configuration of the plurality of recommended site configurations; and
wherein the plurality of recommended changes includes a plurality of recommendations for changes to the proposed order associated with each recommended site configuration of the plurality of recommended site configurations;
wherein each of the plurality of recommended changes is displayed with contextual information; and
wherein the contextual information comprises a quantity of other sites of the plurality of network sites that use a specific site configuration of the plurality of recommended site configuration.

14. The computerized method of claim 8, wherein plurality of network sites comprise small pole-based distributed micro sites and cellular network tower-based macro sites.

15. A computer storage medium has computer-executable instructions that, upon execution by a processor, cause the processor to at least:
obtain a plurality of site configurations associated with a plurality of network sites based on an occurrence of a triggering event;
receive a proposed order associated with a network site of the plurality of network sites from an ordering platform, wherein the proposed order comprises a set of proposed components to be ordered together;
generate a proposed site configuration by combining the set of proposed components of the proposed order and a set of existing components of a current site configuration of the network site;
generate a recommended site configuration using a configuration recommendation model and the proposed site configuration as input to the configuration recommendation model;
identify a component difference between the recommended site configuration and the proposed site configuration;
generate an order recommendation using the identified component difference, wherein the order recommendation comprises a plurality of recommended changes;
provide the generated order recommendation to the ordering platform;
present, via an order interface of the ordering platform, a site identifier of the network site, the set of proposed components of the proposed order, and the plurality of recommended changes;
receive, via the order interface, an ordering user's interaction with the presented plurality of recommended changes;
cause the proposed order to be changed according to a recommended change of the plurality of recommended changes based on the ordering user's interaction;
obtain performance data associated with the plurality of site configurations;
compare the performance data to a defined performance threshold;
filter the plurality of site configurations to remove site configuration that are associated with performance data below the defined performance threshold; and
generate a training set of site configurations comprising the filtered plurality of site configurations, wherein the configuration recommendation model is further trained using the training set of site configurations.

16. The computer storage medium of claim 15, wherein the plurality of recommended changes comprise a recommendation to remove an incompatible component from the proposed order.

17. The computer storage medium of claim 15, wherein the triggering event comprises one or more of the plurality of network sites sending a notification upon a configuration change.

18. The computer storage medium of claim 15, wherein each component of the filtered plurality of site configurations is identified by a corresponding component identifier of a plurality of component identifiers, and wherein the plurality of component identifiers are tokenized and encoded in the configuration recommendation model.

19. The computer storage medium of claim 15, wherein the computer-executable instructions that, upon execution by a processor, further cause the processor to:
present, via the ordering interface, a set of order change buttons, each of the set of order change buttons associated with a corresponding recommended change of the plurality of recommended changes.

20. The computer storage medium of claim 15, wherein generating the recommended site configuration includes generating a plurality of recommended site configurations;
wherein identifying the component difference includes identifying component differences between the proposed site configuration and each recommended site configuration of the plurality of recommended site configurations;
wherein the plurality of recommended changes includes a plurality of recommendations for changes to the proposed order associated with each recommended site configuration of the plurality of recommended site configurations;
wherein each of the plurality of recommended changes is displayed with contextual information; and
wherein the contextual information comprises a quantity of other sites of the plurality of network sites that use a specific site configuration of the plurality of recommended site configuration.

* * * * *